(12) United States Patent　　(10) Patent No.: US 9,088,767 B2
　　Balasubramanian et al.　　(45) Date of Patent: Jul. 21, 2015

(54) ACTIVITIES DUPLICATION VIA RECORDED VIDEO

(71) Applicant: International Business Machines Corporation, Armonk, NY (US)

(72) Inventors: Swaminathan Balasubramanian, Southfield, MI (US); Rick A. Hamilton, II, Richmond, VA (US); Brian M. O'Connell, Cary, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 13/646,881

(22) Filed: Oct. 8, 2012

(65) Prior Publication Data

US 2014/0099069 A1　　Apr. 10, 2014

(51) Int. Cl.
*H04N 5/93*　　(2006.01)
*G11B 27/00*　　(2006.01)

(52) U.S. Cl.
CPC ...................................... *H04N 5/93* (2013.01)

(58) Field of Classification Search
CPC ..... H04N 9/8042; H04N 5/93; G11B 27/034; G11B 2220/90; G11B 27/105; G11B 27/024; G11B 27/032
USPC ................................................. 386/278–279
See application file for complete search history.

(56) References Cited

U.S. PATENT DOCUMENTS

| 5,953,481 | A | * | 9/1999 | Watanabe et al. ............. 386/282 |
| 6,718,337 | B1 | | 4/2004 | Klein et al. |
| 7,430,058 | B2 | | 9/2008 | Silverbrook et al. |
| 8,169,651 | B2 | | 5/2012 | Aoki |
| 8,571,319 | B2 | | 10/2013 | Balasubramanian et al. |

(Continued)

FOREIGN PATENT DOCUMENTS

| CN | 201222256 | 4/2009 |
| JP | 2004213246 A | 7/2004 |

(Continued)

OTHER PUBLICATIONS

Hindus D. etal; Ubiquitous audio:capturing spontaneous collaboration, AN-4817493; 1992.

(Continued)

*Primary Examiner* — Nigar Chowdhury
(74) *Attorney, Agent, or Firm* — Yee & Associates, P.C.; Lisa J. Ulrich

(57) ABSTRACT

A method, system, and computer program product for activities duplication via recorded video are provided in the illustrative embodiments. A playback is performed of a video with control and input data, which includes a recording of video data of a set of activities performed on a second computer, a recording of a set of control data corresponding to the set of activities, and a recording of a set of input data corresponding to the set of activities. Control data from the set of control data is applied to the computer. Applying the control data to the computer changes a state of a process in the computer. Input data from the set of input data is applied to the computer. Applying the input data provides an attribute of the input data to the process in the computer.

20 Claims, 8 Drawing Sheets

(56) References Cited

U.S. PATENT DOCUMENTS

| | | | |
|---|---|---|---|
| 2002/0141731 A1* | 10/2002 | Elberbaum | 386/46 |
| 2004/0018002 A1* | 1/2004 | Kato et al. | 386/94 |
| 2004/0103409 A1 | 5/2004 | Hayner et al. | |
| 2004/0197080 A1* | 10/2004 | Bak | 386/52 |
| 2006/0080432 A1 | 4/2006 | Spataro et al. | |
| 2006/0088282 A1* | 4/2006 | Takagi | 386/46 |
| 2006/0140591 A1* | 6/2006 | Estevez et al. | 386/105 |
| 2006/0156355 A1* | 7/2006 | Kawasaki et al. | 725/88 |
| 2007/0217763 A1* | 9/2007 | Siemens et al. | 386/112 |
| 2007/0248312 A1* | 10/2007 | Kobayashi | 386/52 |
| 2007/0273898 A1 | 11/2007 | Toda | |
| 2008/0260348 A1* | 10/2008 | Maeda et al. | 386/64 |
| 2008/0298773 A1* | 12/2008 | Honjo | 386/95 |
| 2009/0132918 A1 | 5/2009 | Deyo et al. | |
| 2010/0095208 A1 | 4/2010 | White et al. | |
| 2011/0026828 A1 | 2/2011 | Balasubramanian et al. | |
| 2011/0289117 A1 | 11/2011 | Agrawal et al. | |
| 2013/0305134 A1 | 11/2013 | Balasubramanian et al. | |

FOREIGN PATENT DOCUMENTS

| | | |
|---|---|---|
| JP | 2006106937 A | 4/2006 |
| JP | 2007214611 A | 8/2007 |
| WO | 2011081931 A2 | 7/2011 |

OTHER PUBLICATIONS

Anonymous, Recommending Video Programs Based on Audio Fingerprints, Aug. 4, 2009.

Anonymous, Receiving Device Instructions from One User to Be Overlaid on an Image or Video of the Device for Another User, May 17, 2011.

Stokrp, "Using Simulation to Size Document Imaging Systems", Proceedings of the 1994 Summer Computer Simulation Conference, Jul. 18-20, 1994, San Diego, CA, pp. 202-207.

Cardinaels et al., "Automating Metadata Generation: the Simple Indexing Interface", WWW 2005, May 2005, Chiba Japan, pp. 548-556.

"A Scheme for Automatically Copying Images to a Blog Server", IBM Technical Disclosure Bulletin, Jun. 13, 2003, pp. 1-3.

USPTO, Non-Final Office Action—Jan. 7, 2013, U.S. Appl. No. 12/510,758.

Notice of Allowance dated Jun. 20, 2013 regarding U.S. Appl. No. 12/518,758, 10 pages.

Balasubramanian et al., "Enhanced Screen Capture for Human Form Manipulation," U.S. Appl. No. 13/943,387, filed Jul. 16, 2013, 29 pages.

"Recommending Video Programs Based on Audio Fingerprints," IP.com/IPCOM/000185993, Aug. 4, 2009, 25 pages.

* cited by examiner

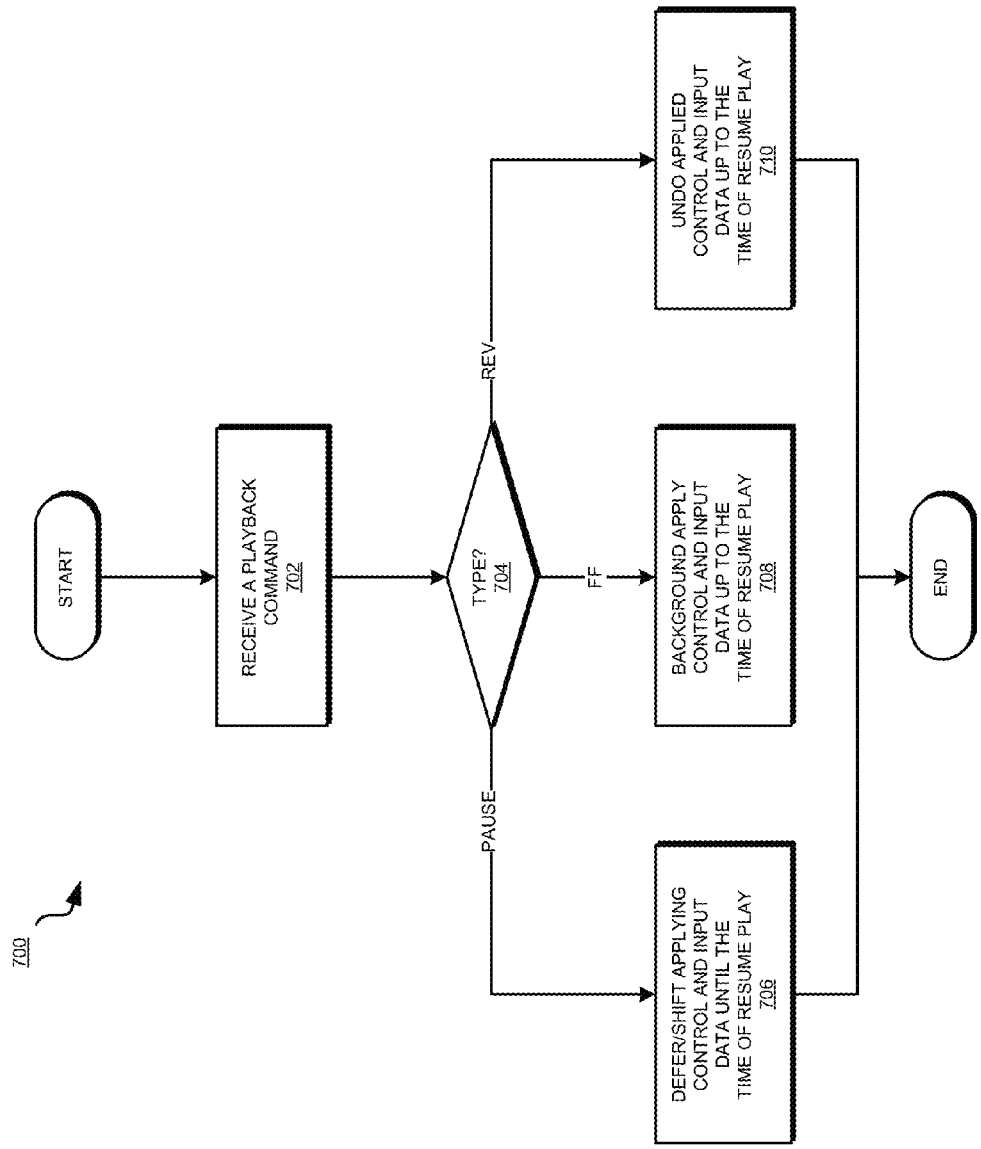

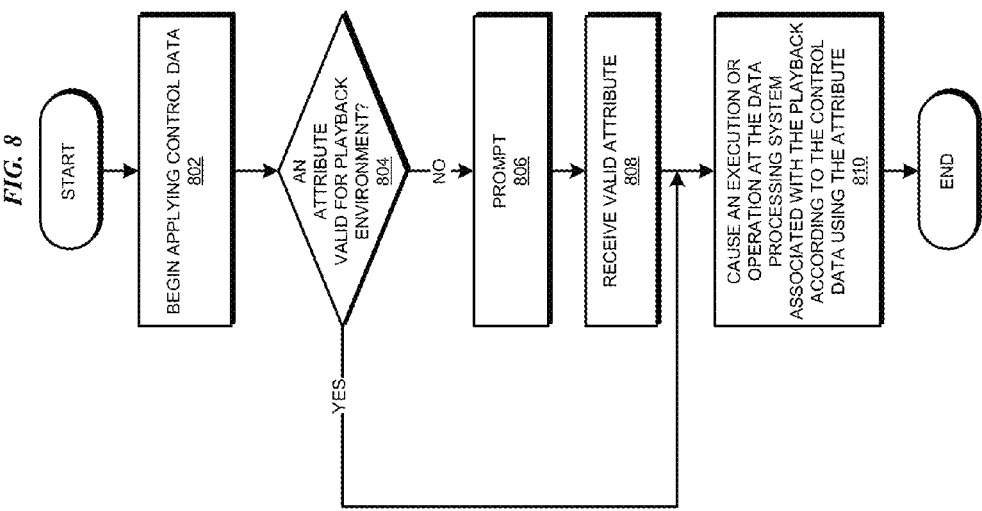

ACTIVITIES DUPLICATION VIA RECORDED VIDEO

BACKGROUND

1. Technical Field

The present invention relates generally to a method, system, and computer program product for communicating activities performed on a data processing system. More particularly, the present invention relates to a method, system, and computer program product for activities duplication via recorded video.

2. Description of the Related Art

Video capture technology enables the recording of activities performed on a data processing system, and subsequent playback of such recording at a future time. Presently available video capture applications perform continuous recording of computer operations, e.g., recording a particular region of the desktop display or recording the graphical user interface (GUI) of a particular application. The presently available video capture applications digitally store the recordings as compressed video in any of the several common formats, such as MPEG, AVI, or 3GP. The digital recordings are then sharable with other users or systems.

Presently available video formats allow for additional metadata. Presently, such metadata is used for storing information such as a location of the video capture, a time of the video capture, the specifications of the hardware device used to perform the video capture, and other such informative data.

Recorded video of activities performed on a data processing system is useful in many ways. For example, a video recording of steps of installing a software product can be useful to those who may be new to installing the software. As another example, providing help in troubleshooting a problem, applying a software patch, and providing training on new applications or systems also benefit from video recording of activities that may be performed on a sample data processing system.

SUMMARY

The illustrative embodiments provide a method, system, and computer program product for activities duplication via recorded video. In at least one embodiment, a method for activities duplication via recorded video is provided. The method includes a computer performing a playback of a video with control and input data, the video with control and input data including a recording of video data of a set of activities performed on a second computer, a recording of a set of control data corresponding to the set of activities, and a recording of a set of input data corresponding to the set of activities. The method further includes the computer applying control data from the set of control data to the computer, wherein the applying the control data to the computer changes a state of a process in the computer. The method further includes the computer applying input data from the set of input data to the computer, wherein the applying the input data provides an attribute of the input data to the process in the computer.

In at least one embodiment, a method for activities duplication via recorded video is provided. The method includes a computer creating a video with control and input data, the video with control and input data including a recording of video data of a set of activities performed on a second computer, a recording of a set of control data corresponding to the set of activities, and a recording of a set of input data corresponding to the set of activities, wherein applying control data from the set of control data when applied to a second computer changes a state of a process in the second computer, and wherein applying input data from the set of input data to the second computer provides an attribute of the input data to the process in the second computer.

In at least one embodiment, a computer program product for activities duplication via recorded video is provided. The computer program product includes one or more computer-readable tangible storage devices. The computer program product further includes program instructions, stored on at least one of the one or more storage devices, to perform a playback of a video with control and input data, the video with control and input data including a recording of a video data of a set of activities performed on a first computer, a recording of a set of control data corresponding to the set of activities, and a recording of a set of input data corresponding to the set of activities. The computer program product further includes program instructions, stored on at least one of the one or more storage devices, to apply control data from the set of control data to a second computer, wherein applying the control data to the second computer changes a state of a process in the second computer. The computer program product further includes program instructions, stored on at least one of the one or more storage devices, to apply input data from the set of input data to the second computer, wherein applying the input data to the second computer provides an attribute of the input data to the process in the second computer.

In at least one embodiment, a computer system for activities duplication via recorded video. The computer system includes one or more processors, one or more computer-readable memories and one or more computer-readable tangible storage devices. The computer system further includes program instructions, stored on at least one of the one or more storage devices for execution by at least one of the one or more processors via at least one of the one or more memories, to perform a playback of a video with control and input data, the video with control and input data including a recording of video data of a set of activities performed on a first computer, a recording of a set of control data corresponding to the set of activities, and a recording of a set of input data corresponding to the set of activities. The computer system further includes program instructions, stored on at least one of the one or more storage devices for execution by at least one of the one or more processors via at least one of the one or more memories, to apply control data from the set of control data to the second computer, wherein applying the control data to the second computer changes a state of a process in the second computer. The computer system further includes program instructions, stored on at least one of the one or more storage devices for execution by at least one of the one or more processors via at least one of the one or more memories, to apply input data from the set of input data to the second computer, wherein applying the input data to the second computer provides an attribute of the input data to the process in the second computer.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 depicts a flowchart of an example process for maintaining time synchronization during playback of a video with control and input data in accordance with an illustrative embodiment; and FIG. 8 depicts a flowchart of an example process of applying control data in a playback environment in accordance with an illustrative embodiment.

DETAILED DESCRIPTION

Figure 1:
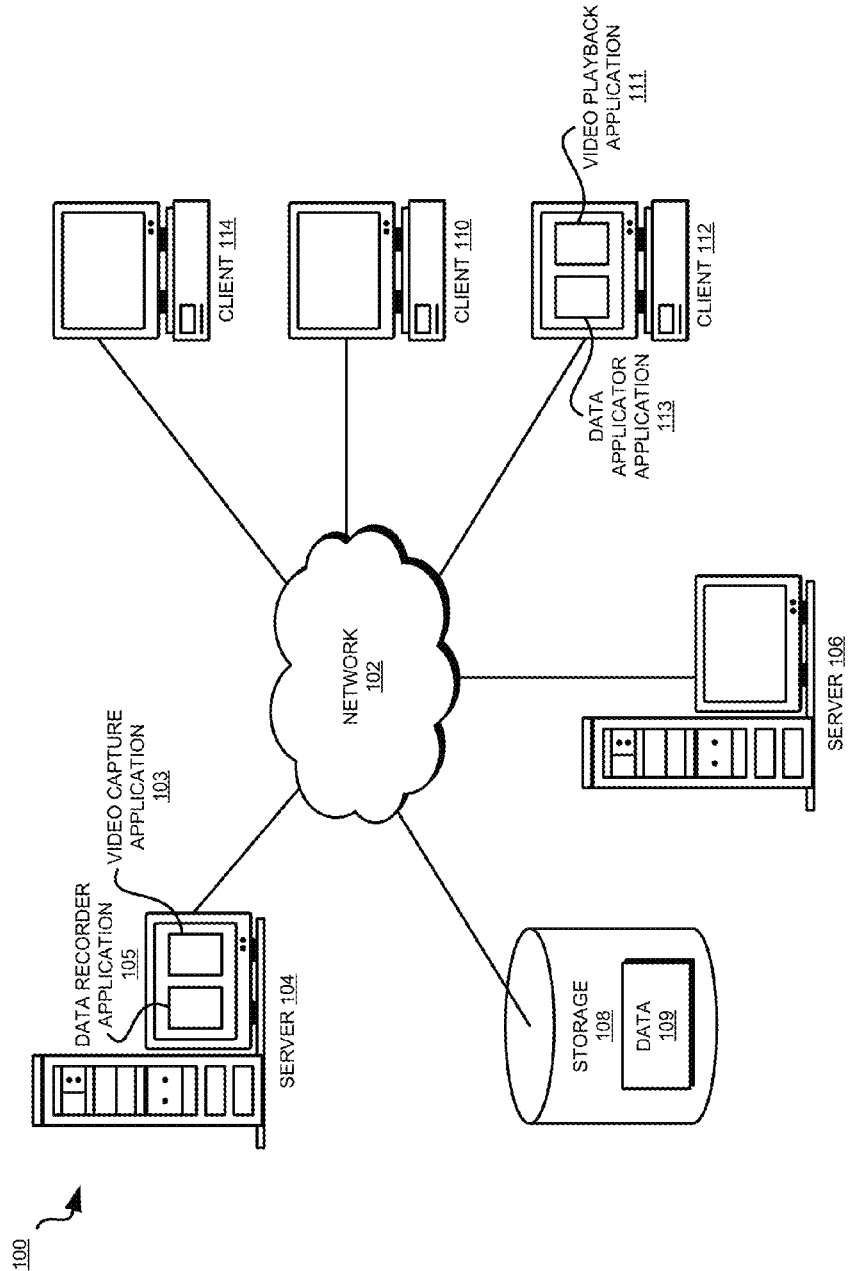
FIG. 1 depicts a pictorial representation of a network of data processing systems in which illustrative embodiments may be implemented.

The illustrative embodiments recognize that simply recording a video of the activities occurring on a data processing system is insufficient to duplicate the same activities on another data processing system in association with which the video may be played back later. Presently, video capture technologies create a 'static' continuous recording of a data processing system's operation, but include neither the commands being performed nor the inputs being provided at that data processing system such that those commands or inputs can be extracted and reproduced at another data processing system.

For example, when a user is recording interactions with a wizard style form interface, no information related to the data they entered or the various actions they performed on the interface is saved. The captured video may be replayed, the actions the user performed may be shown in the video, but the actions the user performed are not available for extraction and reuse at another data processing system.

For example, an installation video recorded using presently available technologies may depict a video footage of a sample display as the installation is performed on that sample data processing system. The video footage however does not provide the sequence of commands, timing between commands or operations, or background tasks in a manner that those same commands can be re-executed, in the same sequence, and with similar timing and background operations, at another data processing system when the video is played back.

As another example, the illustrative embodiments recognize that if the video is provided as a part of an automation tool, the video information itself is insufficient to actually automate the operations depicted therein. For example, if a video recording shows that an application is launched on the system where the video was recorded, playback of that video does not cause the same or similar application to be launched at another data processing system associated with the video playback.

Furthermore, many applications accept inputs to perform their operations. Some examples of the inputs are text entered by a user in a form field, a pointer movement, a button click, a menu selection, or a gesture. Again, the illustrative embodiments recognize that playback of a video might show that the inputs are being made or received at the application in the video, but the playback of the video cannot itself cause the inputs to be duplicated or reproduced at another data processing system associated with the video playback.

The metadata presently available in video recordings is nothing more than information about the video, and is not usable for performing an operation depicted in the video. Thus, the illustrative embodiments recognize that presently, methods do not exist to include control data and input data with a video recording in a manner that allows the control data and input data to be applied at another data processing system by playing the video.

The illustrative embodiments used to describe the invention generally address and solve the above-described problems and other problems related to the limitations of presently available video recordings of activities on a data processing system. The illustrative embodiments provide a method, system, and computer program product for activities duplication via recorded video.

Control data is any data that identifies an operation, enables an application to performs an operation, enables an application to cause an operation to be performed, or a combination thereof, at a data processing system. Some examples of control data include, but are not limited to, data identifying a command to launch an application, data identifying a method call to launch another instance of a GUI of an application, data identifying an operation to open a tab in a browser, data identifying an application programming interface (API) call to establish a communication link over a data network, data identifying an instruction to send a code to a remote system, and data identifying many other such operations to be performed with respect to an application or a component of a data processing system.

Input data is any data that is provided to an application or a component of a data processing system to further a certain function or operation performed by that application or component. Some examples of input data include, but are not limited to, keystroke input, typed or pasted form-field input, pointer movement, gestures, button clicks, menu selections, physical movement of a component of a data processing system, audio input, redirection to data stored elsewhere, and data in any other suitable form provided to an application or a component of a data processing system.

Control data and input data can each include a set of one or more attributes. For example, some control data attributes of a command to launch an application are the application's executable filename, file-path, and launch mode switches. As another example, some control data attributes of an instruction to open a communication link with a website are the website's uniform resource locator (URL), and authentication credentials to access the website.

Similarly, for example, some input data attributes of a form-field input are the text of the input, the timing between the keystrokes, and the dependency of the form-field on the status of another form-field. As another example, some input data attributes of a pointer movement input are timing of the movements, scale of the area where the movements occur, a reference location in the area, and an origin and destination of the movement relative to the reference.

The illustrative embodiments are described with respect to certain control data and input data only as examples. Such control data and input data or their example attributes are not intended to be limiting to the invention. For example, an illustrative embodiment described with respect to an example application launch command control data and its corresponding example attributes can be implemented with respect to an API call control data and its corresponding attributes in a similar manner within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
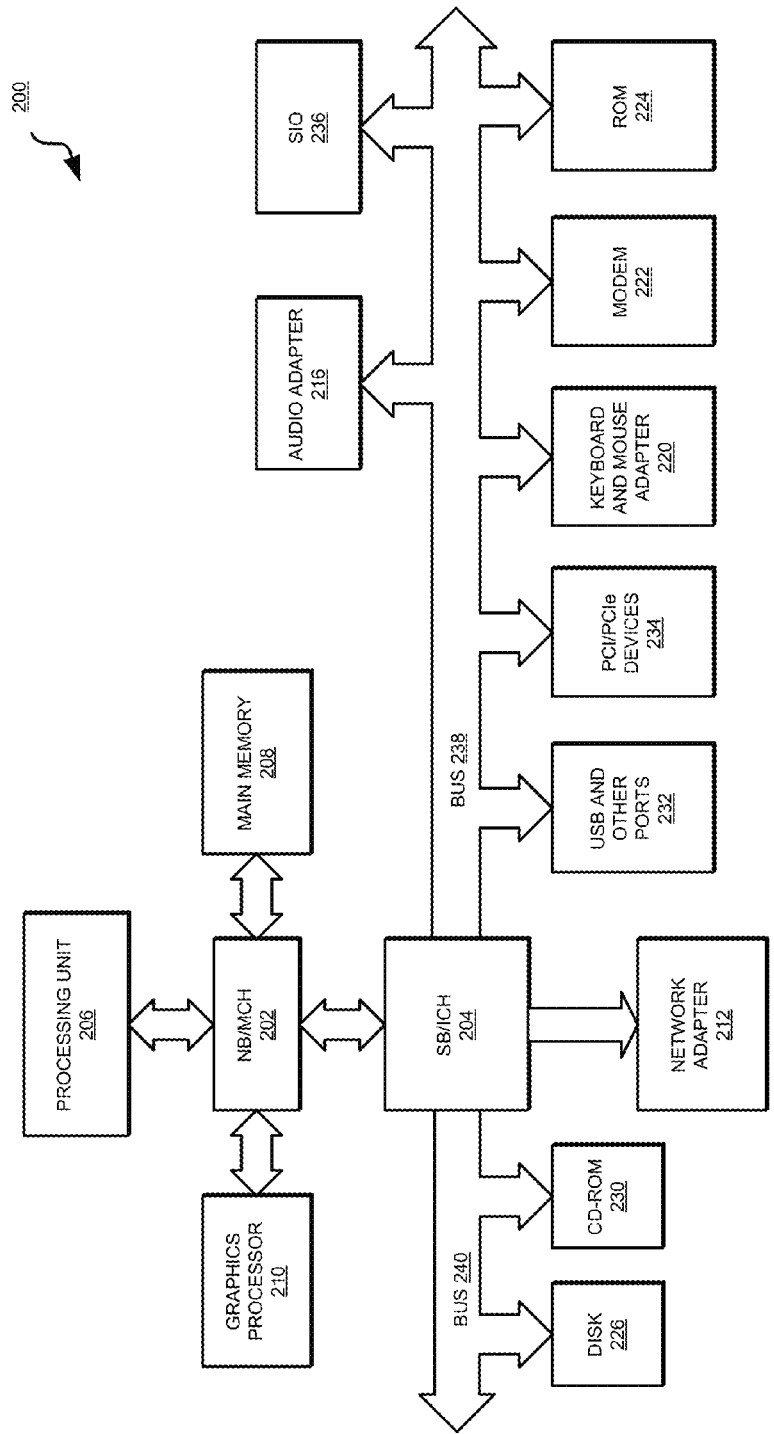
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, server 104 may include video capture application 103. Video capture application 103 may be, for example, an existing application capable of capturing video of activities on a data processing system, and may be modified or configured to operate in conjunction with data recorder application 105 to perform an operation according to an embodiment described herein. Data 109 in storage 108 may be the data of a video recording that includes control data and input data according to an embodiment. Client 112 may include video playback application 111. Video playback application 111 may be, for example, an existing application capable of playing back video of activities on a data processing system, and may be modified or configured to operate in conjunction with data applicator application 113 to perform an operation according to an embodiment described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 112 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive 226, CD-ROM 230, and other similarly usable devices are some examples of computer usable storage devices including computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as data recorder application 105 and data applicator application 113 in FIG. 1, are located on at least one of one or more storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
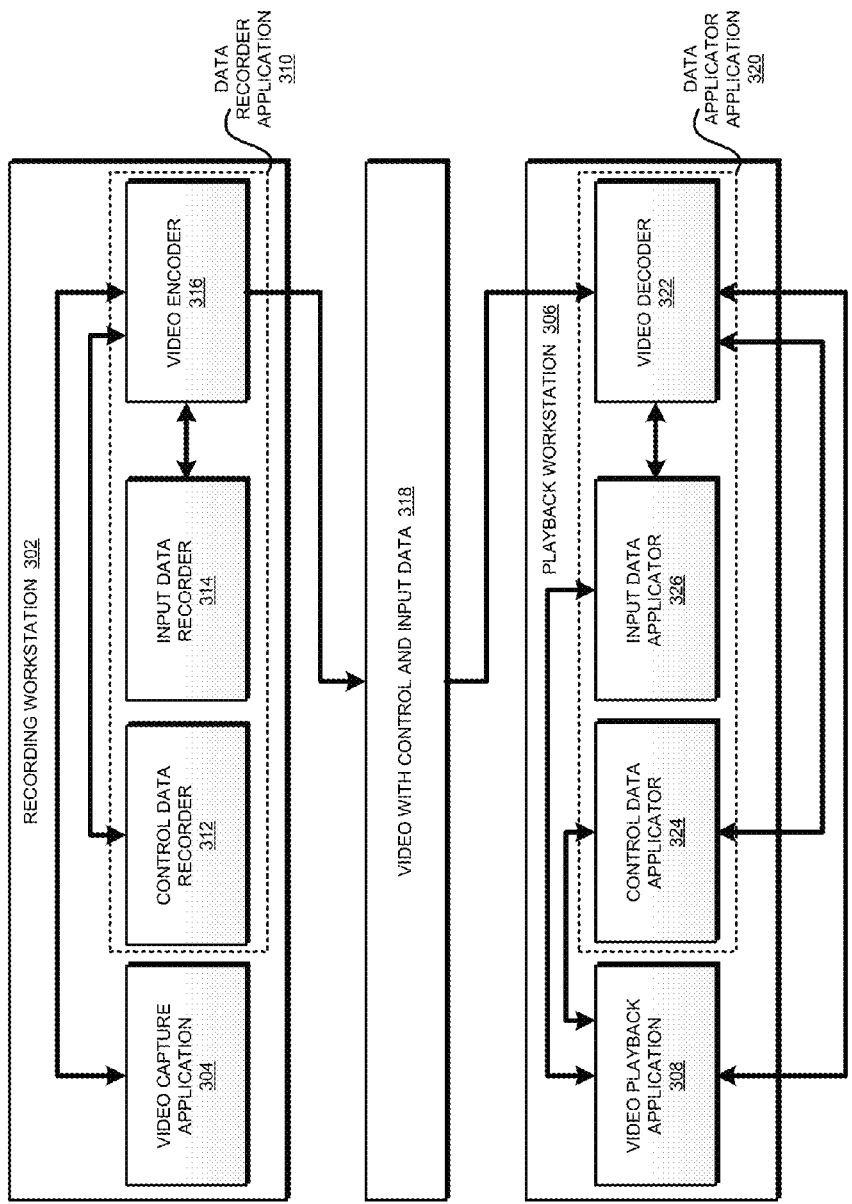
FIG. 3 depicts a block diagram of an example configuration for activities duplication via recorded video in accordance with an illustrative embodiment.

With reference to FIG. 3, this figure depicts a block diagram of an example configuration for activities duplication via recorded video in accordance with an illustrative embodiment. As an example, recording workstation 302 is an example of server 104 in FIG. 1. Video capture application 304 is an example of video capture application 103 in FIG. 1, and has been further modified to include additional features as described herein.

As an example, playback workstation 306 is an example of client 112 in FIG. 1. Video playback application 308 is an example of video playback application 111 in FIG. 1, and has been further modified to include additional features as described herein.

Data recorder application 310, which is an example of data recorder application 105 in FIG. 1, operates in conjunction with video capture application 304, which is an example of video capture application 103 in FIG. 1. Data recorder application 310 includes control data recorder component 312 to capture and record control data that corresponds to the activities being video recorded by video capture application 304. Input data recorder component 314 captures and records input data being provided to applications and system components corresponding to the activities being video recorded by video capture application 304. Video encoder component 316 operates in conjunction with video capture application 304, control data recorder 312, and input data recorder 314. Video encoder component 316 receives and encodes the video data from video capture application 304, control data from control data recorder 312, and input data from input data recorder 314 according to a timeline of the activities on recording workstation 302.

Video encoder component 316 outputs video with control and input data 318. Video with control and input data 318 is an example of data 109 in FIG. 1, and may be stored in any suitable repository, such as storage 108 in FIG. 1.

Sometime after video with control and input data 318 is available, playback workstation 306 accesses video with control and input data 318 using video playback application 308 and data applicator application 320. Data applicator application 320 is an example of data applicator application 113 of FIG. 1. Video decoder 322 of data applicator application 320 sends the video data from video with control and input data 318 to video playback application 308. Video playback application 308 plays back the video data from video with control and input data 318. Video playback application 308 operates in conjunction with certain components of data applicator application 320. Control data applicator 324 applies control data attributes, or a variation thereof suitable for playback workstation 306, to applications, components, or both in playback workstation 306. Input data applicator 326 applies input data attributes, or a variation thereof suitable for playback workstation 306, to applications, components, or both in playback workstation 306.

In one example embodiment, control data recorder 312 identifies the control data and corresponding attributes to be recorded by analyzing the video that is being captured at recording workstation 302. For example, control data recorder 312 may perform analysis of changes between frames of video, optical character recognition (OCR) of portions of a video frame, screen scraping for translating image information into text or other form, or object recognition in video frames. By identifying the changes in the video, control data recorder 312 detects state changes in an application, a component of recording workstation 302, or a combination thereof.

In another embodiment, control data recorder 312 identifies the control data and corresponding attributes to be recorded by monitoring certain aspects of recording workstation 302. For example, control data recorder 312 may monitor recording workstation 302 for changes in memory pages, call stacks, or instruction queues. As another example, control data recorder 312 may monitor recording workstation 302 for function calls, API invocations, commands passed on a certain bus, or a state change or activity of a component in a device driver.

By identifying a change in the video or change in a monitored aspect of recording workstation 302, control data recorder 312 detects state changes in an application, a component of recording workstation 302, or a combination thereof. In response to determining a state change, control data recorder 312 identifies the control data that causes that change.

In one embodiment, data recorder application 310 may prompt a user, an application, or a system to provide an attribute of the control data that causes the change. In response to receiving the requested attribute, data recorder application 310 provides the control data attribute to control data recorder 312.

Data recorder application 310 relies on knowledge available to data recorder application 310 for identifying the control data and the corresponding attributes. For example, a registry or a library of function calls, interface parameters, command paths, command switches, APIs etc. may be available or accessible to data recorder application 310. Data recorder application 310 can select from such a library one or more entries that can cause the state change and compose control data and its attributes corresponding to the change.

Input data recorder 314 can capture and record input data in a similar manner as control data recorder 312. For example, an embodiment of input data recorder 314 may also receive input data, or an attribute thereof, responsive to a prompt from data recorder application 310. Another embodiment of input data recorder 314 may receive the input data or an attribute thereof by analysis of video data, lookup of a repository or a library, or a combination thereof.

In one example embodiment, control data applicator 324 identifies the control data and corresponding attributes that are to be applied to an application, a component, or a combination thereof, at playback workstation 306. The control data attribute may be applicable to playback workstation 306 in the form available from video decoder component 322.

Under certain circumstances, the control data attribute may not be directly applicable to playback workstation 306 in the form available from video decoder component 322. For example, control data applicator 324 may detect an attribute of certain control data, e.g., a file path of an application launch command. Control data applicator 324 may find that the file path recorded in recording workstation 302 does not exist in playback workstation 306.

In one embodiment, data applicator application 320 prompts a user or an application at playback workstation 306 to provide a substitute attribute suitable for applying the control data in playback workstation 306's environment. In another embodiment, data applicator application 320 looks up a knowledge source, such as a registry or a library, to find a substitute attribute suitable for applying the control data in playback workstation 306's environment. Control data applicator 324 receives the control data attribute responsive to the prompt or lookup and applies to an application, component, or a combination thereof, in playback workstation 306.

Input data applicator 326 applies input data in a similar manner as control data applicator 324. For example, an embodiment of input data applicator 326 may also receive substitute input data, or an attribute thereof, responsive to a prompt from data applicator application 320. Another embodiment of input data applicator 326 may receive the input data or an attribute thereof by performing an analysis of video data, lookup of a repository or a library, or a combination thereof.

Figure 4:
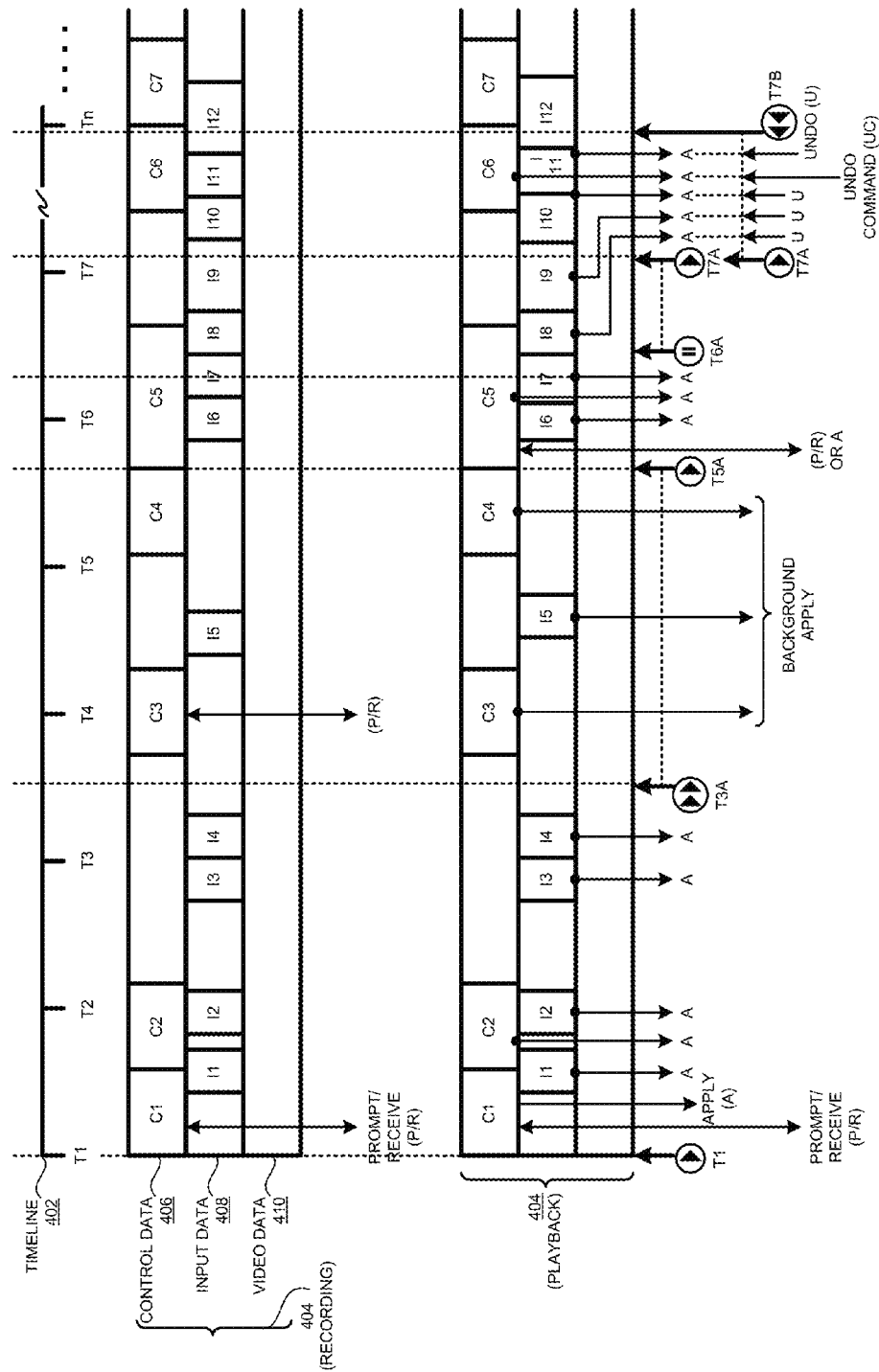
FIG. 4 depicts a block diagram of timeline synchronization for activities duplication via recorded video in accordance with an illustrative embodiment.

With reference to FIG. 4, this figure depicts a block diagram of timeline synchronization for activities duplication via recorded video in accordance with an illustrative embodiment. Timeline 402 is an example timeline of recording video with control and input data 404. Video with control and input data 404 is an example of video with control and input data 318 in FIG. 3 and recorded in the manner described with respect to FIG. 3.

Video with control and input data 404 includes control data 406, input data 408, and video data 410 that is recorded as time progresses along timeline 402. Discrete times T1, T2, T3, T4, T5, T6, T7, and Tn are depicted on timeline 402 as an example guide for understanding the sequence of control data C1, C2, C3, C4, C5, C6, and C7 in control data 406, and input data I1, I2, I3, I4, I5, I6, I7, I8, I9, I10, I11, and I12 in input data 408, as they occur during the operation of a recording data processing system, such as recoding workstation 302 in FIG. 3. For example, discrete time T1 may map to 10:00 AM one morning when video with control and input data 404 is recorded, and may map to 3:00 PM the next afternoon when video with control and input data 404 is played back.

Assume that recording of video with control and input data 404 begins at time T1 and a data recorder application according to an embodiment identifies that control data C1 is to be recorded. Further assume that a state change corresponding to control data C1, e.g., a browser launch, has either already occurred at T1 or is occurring at T1. As an example, assume that the data recorder application cannot identify an attribute of control data C1, e.g., a file path of the browser's executable file. According to an embodiment, the data recorder application prompts a user or an application for providing the attribute of C1. Responsive to the prompt, the data recorder application receives the attribute and records C1 along recording timeline 402.

The data recorder application of an embodiment similarly identifies C2-C7. In some cases, the data recorder application is able to identify the attributes of a particular control data, e.g., C2 and C4, and records that control data along recording timeline 402 by recording those control data attributes. In some other cases, the data recorder application may be unable to identify an attribute of a particular control data, e.g., C3. In such cases, the data recorder application prompts and receives (P/R) the attribute of that control data, as described with respect to C1, and records that control data along recording timeline 402.

The data recorder application according to an embodiment also records input data I1-I12 as they occur over timeline 402. For example, I1 may be a menu selection that causes C2—a new GUI launch—to occur. As an example, I3 and I4 may be form field entries, e.g., user ID and password, on the new GUI launched as a result of C2. In this example, C3 may be a command to establish a secure http based on the information in I3 and I4, which may present a challenge question, and input data I5 may be a response thereto.

The examples of control data and input data are described only for illustrating the recording operation of video with control and input data 404 and are not intended to be limiting on the illustrative embodiments. Using this disclosure, those of ordinary skill in the art will be able to create numerous other combinations of control data 406, input data 408, and video data 410 to create variations of video with control and input data 404, and the same are contemplated within the scope of the illustrative embodiments.

At playback time, video with control and input data 404 is played back, with control data 406 and input data 408 being applied according to timeline 402. Depending on the playback operations performed on video data 410, such as "PLAY", "REWIND", FAST FORWARD", or "PAUSE" (depicted in FIG. 4 by the well-known icons for those functions).

Assume that the playback begins at time T1 with the PLAY function activation on video data 410. A data applicator application according to an embodiment attempts to apply control data C1 to the data processing system associated with the playback, such as playback workstation 306 in FIG. 3.

The data applicator application determines that an attribute of C1 does not match the environment of the data processing system associated with the playback. For example, the file path for the browser may be different in the data processing system associated with the playback as compared to the file path in the data processing system associated with the recording. Or, as another example, the data processing system associated with the playback may have a preference to launch a different browser than the browser in the recording.

Accordingly, the data applicator application prompts and receives a substitute attribute for C1 during playback and applies (A) control data C1 that is modified with the substitute attribute to suit the data processing system associated with the playback. The data applicator application applies (A) input data I1, I2, I3, and I4, and control data C2 to the data processing system associated with the playback.

Generally, the data applicator application may perform the apply operation in a manner that is specific to the control data or input data being applied. The apply operation results in either causing an execution on the data processing system using the control data or input data, causing an effect of the control data or input data to be created on the data processing system, performing an operation on the data processing system that corresponds to the application or effect of the control data or input data as depicted in the recording of video data 410, or a combination thereof.

Assume that at some point between times T3 and T4 along timeline 402—time T3A, a user or a system activates the FAST FORWARD function on video data 410 as shown. The user or the system resumes the PLAY function at some point between times T5 and T6 along timeline 402—time T5A. The data applicator application applies control data C3 and C4, and input data I5 as a background apply operation to maintain synchronization of the duplication of the recorded activities on the data processing system associated with the playback.

In other words, not only is video data 410 advanced as a result of the FAST FORWARD function up to the time the PLAY function is resumed, but the intervening control data and input data that were skipped-over as a result of the FAST FORWARD operation are also applied to the activities occurring on the data processing system associated with the playback so that when the user or the system resumes the playback at time T5A, the data processing system is also in a state that matches the state depicted in video data 410 at time T5A.

When playback resumes, the data applicator application of an embodiment attempts to apply control data C5. As described earlier, the data applicator application may prompt and receive a substitute attribute for control data C5 for system-specific application of C5 to the data processing system associated with the playback. The data applicator application applies control data C5 and input data I6 and I7 as playback time progresses along timeline 402, as described earlier.

Assume that at some point between times T6 and T7 along timeline 402—time T6A, a user or a system activates the PAUSE function on video data 410 as shown. The playback resumes at time some point after time T7 along timeline 402—time T7A—when the PLAY function is reactivated. When the playback resumes, the data applicator application identifies those control data and input data that were present in video with control and input data 404 during the time that elapsed between the pausing and resumption of playback.

In the depicted example, input data I8 and I9 should have been applied to the data processing system associated with the playback had the playback of video with control and input data 404 not paused at time T6A and resumed at time T7A. Accordingly, the data applicator application applies input data I8 and I9 upon resuming of the PLAY function and then continues to apply other control data and input data that would normally be applied along timeline 402 after time T7A.

The data applicator application applies I10, C6, and I11 until time T7B when a user or a system activates a REWIND function on video data 410 to resume playback at time T7A. The data applicator application performs an undo (U) operation to back-out those control data and input data that were applied between times T7A and T7B so that when the video data resumes at time T7A in timeline 402, the data processing system associated with the playback is also in a state that corresponds to the state the data processing system depicted in the recording was at time T7A. The undo operation removes the effects of I11, C6, I10, I9, and I8 to place the data processing system associated with the playback in the state existing at time T7A.

The data applicator application performs the undo operation according to the control data or the input data that has to be undone. For example, if an effect of C6 was to close a browser window, the data applicator application reopens the browser window and populates the window with content up to the time before the closing during the undo operation. As another example, if an effect of C6 were to establish a network connection, the data applicator application terminates the network connection during the undo operation. As another example, if an effect of I9 were to populate a form field, the data applicator application reverts the form field during the undo operation to its prior state, for example, to a default value, a previous value, or null value. As another example, if an effect of I10 were to highlight a portion of a display, the data applicator application removes the highlighting during the undo operation. When playback resumes at time T7A, the data applicator application resumes applying the control data and input data as described earlier.

One example embodiment of the data recorder application may record and present the previously supplied inputs as a selection choice to reduce effort. For example, a user may have gone through significant effort to supply values in a form. The user may then rewind, especially accidentally. In such an example scenario, the user may want to be able to apply the previous inputs to save time. In another example scenario, the user may be rewinding to correct only one of several forms the user filled out, in which case the user may want to fill the other forms with the previously supplied inputs.

Generally, the data applicator application may perform the undo operation in a manner that is specific to the control data or input data being undone. The undo operation results in either removing the control data or input data, removing an effect of the control data or input data, performing a different operation that counters the application or effect of the control data or input data, or a combination thereof.

Figure 5:
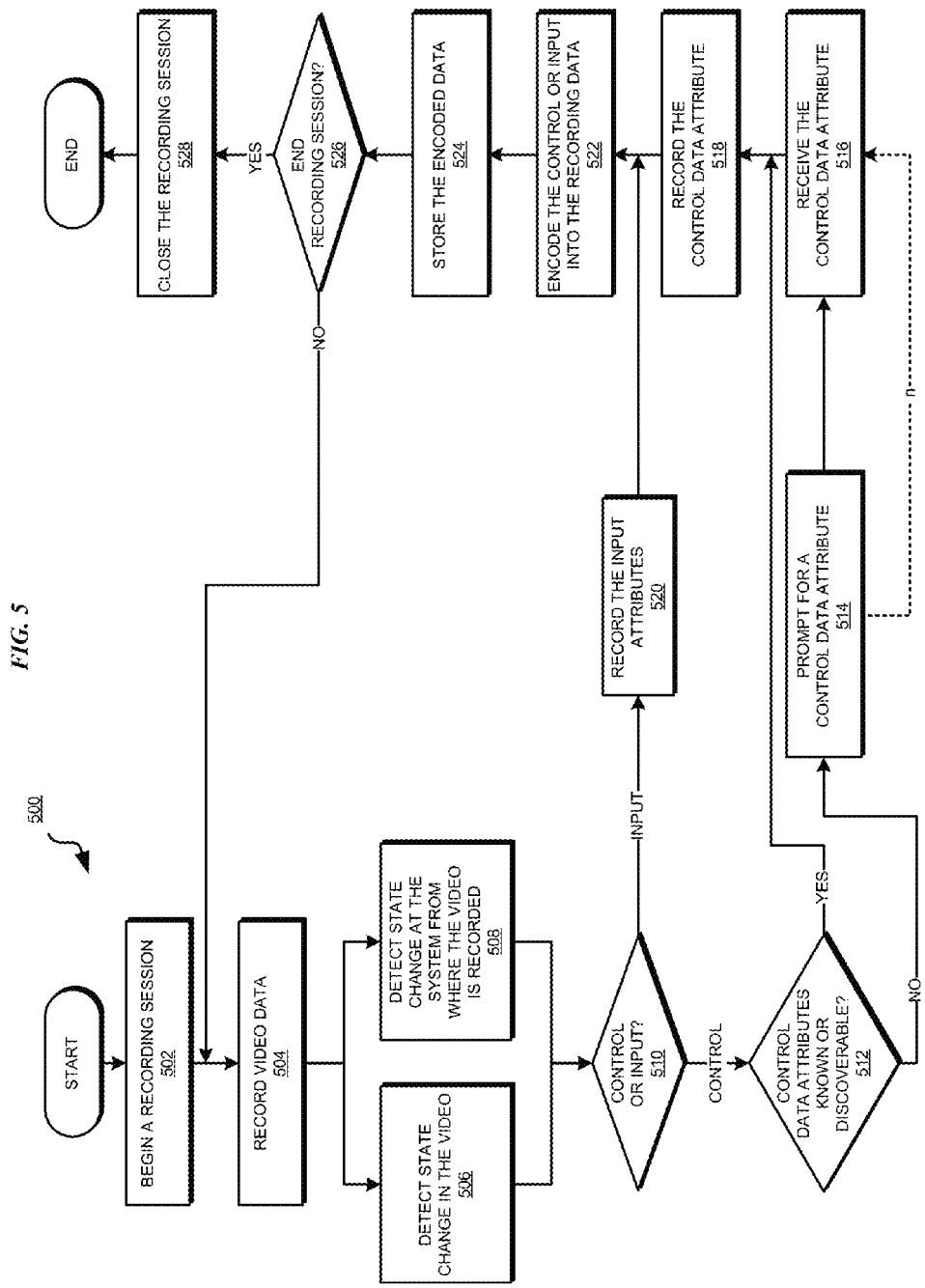
FIG. 5 depicts a flowchart of an example process for creating a video with control and input data for activities duplication via recorded video in accordance with an illustrative embodiment.

With reference to FIG. 5, this figure depicts a flowchart of an example process for creating a video with control and input data for activities duplication via recorded video in accordance with an illustrative embodiment. Process 500 can be implemented in a data recorder application, such as data recorder application 310 in FIG. 3.

A data recorder application according to an embodiment begins a recording session, such as to record video with control and input data 404 in FIG. 4 (block 502). The data recorder application records or causes a video capture application to record video data portion of the video with control and input data of an embodiment (block 504).

In the manner of an embodiment described earlier, the data recorder application detects a state change in the video (block 506), a state change in the system where the video is being recorded (block 508), or a combination thereof. The data recorder application determines whether the state change corresponds to control data or input data (block 510).

If the data recorder application determines that the state change corresponds to control data that should be recorded in the video with control and input data ("Control" path of block 510), the data recorder application further determines whether the attributes of the control data are known or discoverable in the manner of an embodiment described earlier (block 512). If an attribute of the control data is not known, not discoverable, or both ("No" path of block 512), the data recorder application prompts a user or a system for the control data attribute (block 514). The data recorder application receives the control data attribute from the user or the system in response to the prompt of block 514 (block 516). The data recorder application records the control data including the received attribute in the video with control and input data (block 518) and proceeds to block 522 in process 500.

If the attributes of the control data are known, discoverable, or both ("Yes" path of block 512), the data recorder application proceeds to block 518 in process 500. If the data recorder application determines that the state change corresponds to input data that should be recorded in the video with control and input data ("Input" path of block 510), the data recorder application records the input attributes (block 520) and proceeds to block 522 in process 500.

The data recorder application encodes the control data or input data into the recording, to wit, in the video with control and input data (block 522).

The data recorder application stores the encoded video with control and input data such that the video with control and input data is accessible for playback at another data processing system (block 524). The data recorder application determines whether to end the recording session (block 526).

If the session is to continue ("No" path of block 526), the data recorder application returns to block 504 of process 500. If the session is to end ("Yes" path of block 526), the data recorder application closes the recording session in any suitable manner (block 528), and ends process 500 thereafter.

Figure 6:
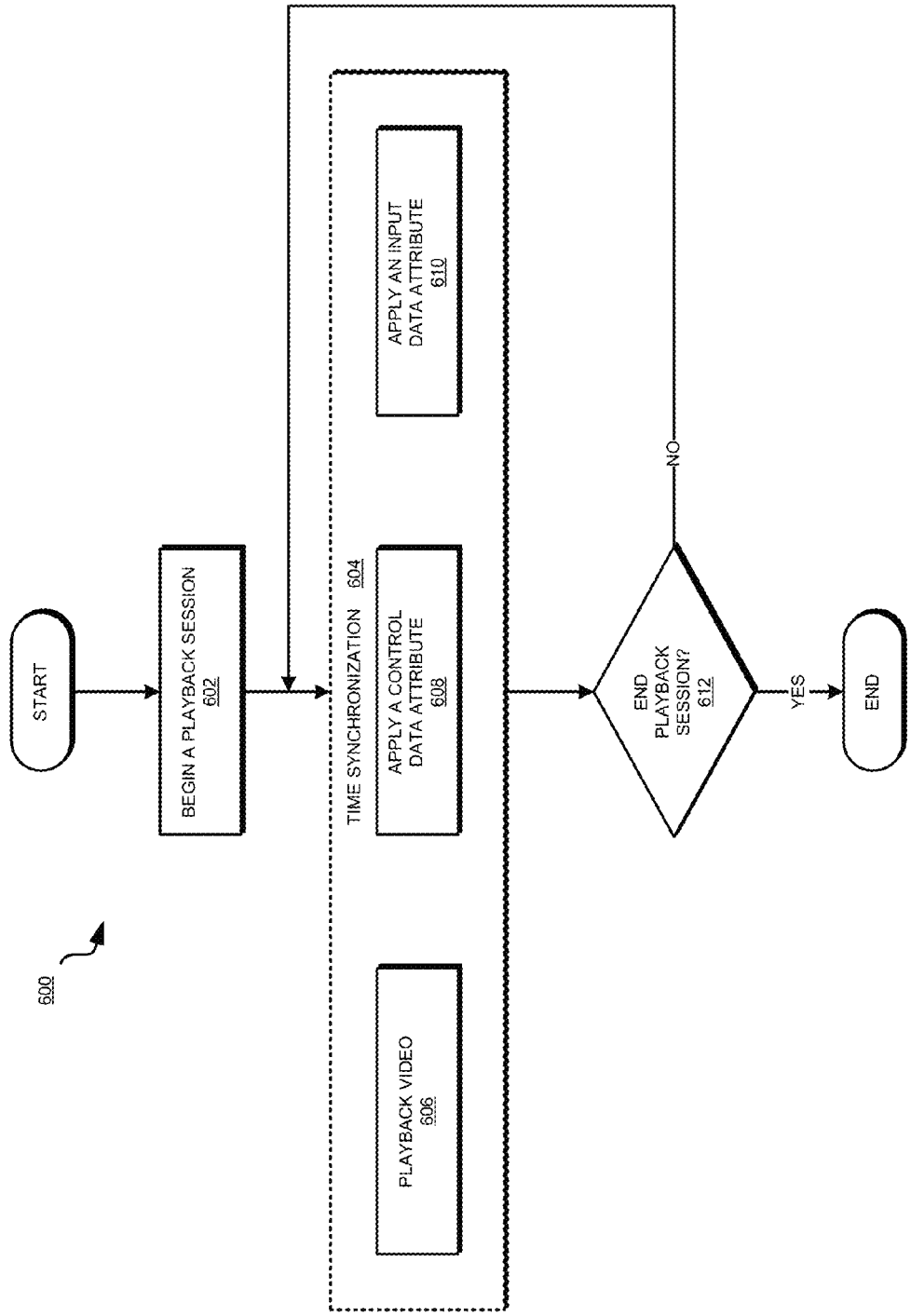
FIG. 6 depicts a flowchart of an example process for playing back a video with control and input data for activities duplication via recorded video in accordance with an illustrative embodiment.

With reference to FIG. 6, this figure depicts a flowchart of an example process for playing back a video with control and input data for activities duplication via recorded video in accordance with an illustrative embodiment. Process 600 can be implemented in a data applicator application, such as data applicator application 320 in FIG. 3.

A data applicator application according to an embodiment begins a playback session, such as a playback of the video data of a video with control and input data produced as a result of process 500 in FIG. 5 via a video playback application (block 602). The data applicator application maintains time synchronization of the various aspects of the playback as described with respect to the example depicted in FIG. 4 (block 604). Particularly, the data applicator application maintains the time synchronization of video data playback according to a timeline of the video with control and input data (block 606), applies an attribute of a control data according to the timeline of the video with control and input data (block 608), applies an attribute of an input data according to the timeline of the video with control and input data (block 610), or a combination thereof. The data applicator application maintains the time synchronization of video data playback, in part, by undoing (not shown) an attribute of a control data according to the timeline of the video with control and input data, undoing (not shown) an attribute of an input data according to the timeline of the video with control and input data, or a combination thereof, depending on the particular playback operation being performed at any given time in the timeline.

The data applicator application determines whether to end the playback session (block 612). If the session is to continue ("No" path of block 612), the data applicator application returns to block 604 of process 600. If the session is to end ("Yes" path of block 612), the data applicator application ends playback process 600 thereafter.

With reference to FIG. 7, this figure depicts a flowchart of an example process for maintaining time synchronization during playback of a video with control and input data in accordance with an illustrative embodiment. Process 700 can be implemented in a data applicator application, such as data applicator application 320 in FIG. 3, as a part of block 604 in FIG. 6.

A data applicator application according to an embodiment receives a playback command, such as to PAUSE, FAST FORWARD, or REWIND, a video playback (block 702). The data applicator application determines a type of the playback command (block 704).

If the command is a PAUSE command ("Pause" path of block 704), the data applicator application defers or time-shifts applying the control and input data of the video with control and input data until the time the play operation is resumed (block 706). If the command is a command to advance the playback, such as a FAST FORWARD command ("FF" path of block 704), the data applicator application applies the control and input data of the video with control and input data as a background operation up to the time the play operation is resumed (block 708). If the command is a REWIND command ("Rev" path of block 704), the data applicator application undoes the applied control and input data of the video with control and input data up to the time the play operation is resumed (block 710). The data applicator application ends process 700 thereafter.

With reference to FIG. 8, this figure depicts a flowchart of an example process of applying control data in a playback environment in accordance with an illustrative embodiment. Process 800 can be implemented in a data applicator application, such as data applicator application 320 in FIG. 3, as a part of block 606 in FIG. 6.

The data applicator application begins applying control data from the video with control and input data (block 802). The data applicator application determines whether an attribute of the control data is valid for the playback environment, to with, valid for the data processing system associated with the playback (block 804). If the attribute is not valid for the playback environment ("No" path of block 804), the data applicator application prompts a user or a system for a substitute attribute (block 806).

The data applicator application receives the substitute attribute (block 808). The data applicator application applies the control data using the substitute attribute by causing an execution of an instruction, causing an operation, or a combination thereof, at the data processing system associated with the playback (block 810). The data applicator application ends process 800 thereafter.

In one example embodiment, if the video playback stops, or a request is received to exit the video playback prior to the application of the last control or input data, the user may be given a choice to undo all controls and inputs that were applied during the video playback. In another example embodiment, the ability to skip to or go to a point in time in a video may either be blocked by the video playback application or may be translated into the equivalent fast forward or rewind commands, depending on whether the skip to time is before or after the skip from time.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for activities duplication via recorded video. Using an embodiment, an activity performed on a data processing system during a video recording of the activity can be performed on another data processing system while playing the video recording. An instruction executed on the recording data processing system can be executed on a playback data processing system. An input provided on an application on the recording data processing system can be automatically provided in a corresponding application on the playback data processing system. An embodiment maintains time-synchronization of state changes at the playback data processing system responsive to the playback operations performed during the playback.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for activities duplication via recorded video, the method comprising:
   a computer performing a playback of a video with a sequence of control and input data encoded into the video as the sequence of control and input data occurred during an operation of a second computer as time progressed along a timeline maintaining timing between each control and input datum in the sequence of control and input data that corresponds to a set of activities performed by a user on the second computer recorded in the video, wherein the video with the sequence of control and input data encoded includes a recording of video data of the set of activities performed by the user on the second computer, a recording of a set of control data corresponding to the set of activities performed by the user on the second computer to be applied to an application that performs a similar operation in the computer during the playback of the video, and a recording of a set of input data entered by the user on the second computer corresponding to the set of activities performed by the user on the second computer to be applied to the application to further performance of the similar operation by the application in the computer during the playback of the video;
   the computer applying control data from the set of control data to the application performing the similar operation in the computer according to the timeline while playing the video, wherein the applying of the control data to the application performing the similar operation in the computer changes a state of the application in the computer during the playback of the video; and
   the computer applying input data from the set of input data to the application performing the similar operation in the computer according to the timeline while playing the video, wherein the applying of the input data to the application furthers the performance of the similar operation by the application in the computer during the playback of the video.

2. The method of claim 1, further comprising:
   the computer time-synchronizing the playback of the video with the timeline maintaining the timing between each control and input datum in the sequence of control and input data that corresponds to the set of activities performed by the user on the second computer recorded in the video such that the state of the application performing the similar operation in the computer at a given time in the timeline matches a state of a similar application performing the operation on the second computer at a corresponding time in the timeline as depicted in the video data of the video with the sequence of control and input data encoded.

3. The method of claim 2, further comprising:
   the computer receiving a playback command; and
   the computer adjusting applying of second control data and second input data responsive to the playback command.

4. The method of claim 3, wherein the playback command is a command to pause the playback of the video, and wherein the adjusting comprises:
   the computer deferring applying the second control data and the second input data until the computer receives a second playback command to resume the playback of the video.

5. The method of claim 3, wherein the playback command is a command to advance the playback of the video, and wherein the adjusting comprises:
   the computer applying in a background the second control data and the second input data to the application performing the similar operation in the computer up to a time in the timeline when the computer receives a second playback command to resume the playback of the video to maintain synchronization of the set of activities performed by the user on the second computer with the sequence of control and input data encoded in the video corresponding to the set of activities.

6. The method of claim 3, wherein the playback command is a command to rewind the playback of the video, and wherein the adjusting comprises:
   the computer undoing the second control data and the second input data previously applied to the application performing the similar operation in the computer back to a time in the timeline when the computer receives a second playback command to resume the playback of the video to maintain synchronization of the set of activities performed by the user on the second computer with the sequence of control and input data encoded in the video corresponding to the set of activities.

7. A computer program product comprising one or more non-transitory computer-readable storage devices and computer-readable program instructions which are stored on the one or more storage devices and when executed by one or more processors, perform the method of claim 1.

8. A computer system comprising one or more processors, one or more non-transitory computer-readable memories, one or more non-transitory computer-readable storage devices and program instructions which are stored on the one or more storage devices for execution by the one or more processors via the one or more memories and when executed by the one or more processors perform the method of claim 1.

9. A method for activities duplication via recorded video, the method comprising:
    a computer creating a video with a sequence of control and input data encoded into the video as the sequence of control and input data occurs during an operation of the computer as time progresses along a timeline maintaining timing between each control and input datum in the sequence of control and input data that corresponds to a set of activities performed by a user on the computer recorded in the video, wherein the video with the sequence of control and input data encoded includes a recording of video data of the set of activities performed by the user on the computer, a recording of a set of control data corresponding to the set of activities performed by the user on the computer to be applied to an application that performs a similar operation in a second computer during playback of the video on the second computer, and a recording of a set of input data entered by the user on the computer corresponding to the set of activities performed by the user on the computer to be applied to the application that performs the similar operation in the second computer to further performance of the similar operation by the application during the playback of the video on the second computer, wherein applying control data from the set of control data to the application performing the similar operation in the second computer according to the timeline changes a state of the application in the second computer during the playback of the video, and wherein applying input data from the set of input data to the application performing the similar operation in the second computer according to the timeline furthers performance of the similar operation by the application in the second computer during the playback of the video.

10. The method of claim 9, wherein the control data from the set of control data comprises a set of attributes, and wherein the creating of the video with the sequence of control and input data encoded comprises:
    the computer detecting a state change in a similar application in the computer;
    the computer identifying an instruction that caused the state change in the similar application;
    the computer identifying an attribute of the instruction, the attribute forming a member of the set of attributes; and
    the computer recording the instruction and the attribute in the video with the sequence of control and input data encoded.

11. The method of claim 10, wherein the detecting the state change comprises:
    the computer analyzing the video data to detect a change between frames in the video data, the change in the video data indicating the state change in the similar application in the computer.

12. The method of claim 10, wherein the detecting the state change comprises:
    the computer monitoring a component in the computer to detect a change in the component, the change in the component indicating the state change in the computer.

13. The method of claim 10, wherein the state change includes a change in a process executing in the computer.

14. A computer program product for activities duplication via recorded video, the computer program product comprising:
    one or more non-transitory computer-readable storage devices and program instructions stored on the one or more storage devices that are executed by one or more processors;
    program instructions, stored on at least one of the one or more storage devices, to perform a playback of a video with a sequence of control and input data encoded into the video as the sequence of control and input data occurred during an operation of a second computer as time progressed along a timeline maintaining timing between each control and input datum in the sequence of control and input data that corresponds to a set of activities performed by a user on the second computer recorded in the video, wherein the video with the sequence of control and input data encoded includes a recording of video data of the set of activities performed by the user on the second computer, a recording of a set of control data corresponding to the set of activities performed by the user on the second computer to be applied to an application that performs a similar operation in a computer during the playback of the video, and a recording of a set of input data entered by the user on the second computer corresponding to the set of activities performed by the user on the second computer to be applied to the application to further performance of the similar operation by the application in the computer during the playback of the video;
    program instructions, stored on at least one of the one or more storage devices, to apply control data from the set of control data to the application performing the similar operation in the computer according to the timeline while playing the video, wherein applying the control data to the application performing the similar operation in the computer changes a state of the application in the computer during the playback of the video; and
    program instructions, stored on at least one of the one or more storage devices, to apply input data from the set of input data to the application performing the similar operation in the computer according to the timeline while playing the video, wherein applying the input data to the application furthers the performance of the similar operation by the application in the computer during the playback of the video.

15. The computer program product of claim 14, further comprising:
    program instructions to time-synchronize the playback of the video with the timeline maintaining the timing between each control and input datum in the sequence of control and input data that corresponds to the set of activities performed by the user on the second computer recorded in the video such that the state of the application performing the similar operation in the computer at a given time in the timeline matches a state of a similar application performing the operation on the second computer at a corresponding time in the timeline as depicted in the video data of the video with the sequence of control and input data encoded.

16. The computer program product of claim 15, further comprising:
program instructions, stored on at least one of the one or more storage devices, to receive a playback command; and
program instructions, stored on at least one of the one or more storage devices, to adjust application of second control data and second input data responsive to the playback command.

17. The computer program product of claim 16, wherein the playback command is a command to pause the playback of the video, and wherein the program instructions to adjust application of the second control data and the second input data comprise:
program instructions to defer applying the second control data and the second input data until the second computer receives a second playback command to resume the playback of the video.

18. The computer program product of claim 16, wherein the playback command is a command to advance the playback of the video, and wherein the program instructions to adjust application of the second control data and the second input data comprise:
program instructions to apply in a background the second control data and the second input data to the application performing the similar operation in the computer up to a time in the timeline when the computer receives a second playback command to resume the playback of the video to maintain synchronization of the set of activities performed by the user on the second computer with the sequence of control and input data encoded in the video corresponding to the set of activities.

19. The computer program product of claim 16, wherein the playback command is a command to rewind the playback of the video, and wherein the program instructions to adjust application of the second control data and the second input data comprise:
program instructions to undo the second control data and the second input data previously applied to the application performing the similar operation in the computer back to a time in the timeline when the computer receives a second playback command to resume the playback of the video to maintain synchronization of the set of activities performed by the user on the second computer with the sequence of control and input data encoded in the video corresponding to the set of activities.

20. A computer system for activities duplication via recorded video, the computer system comprising:
one or more processors, one or more non-transitory computer-readable memories and one or more non-transitory computer-readable storage devices;
program instructions, stored on at least one of the one or more storage devices for execution by at least one of the one or more processors via at least one of the one or more memories, to perform a playback of a video with a sequence of control and input data encoded into the video as the sequence of control and input data occurred during an operation of a second computer as time progressed along a timeline maintaining timing between each control and input datum in the sequence of control and input data that corresponds to a set of activities performed by a user on the second computer recorded in the video, wherein the video with the sequence of control and input data encoded includes a recording of video data of the set of activities performed by the user on the second computer, a recording of a set of control data corresponding to the set of activities performed by the user on the second computer to be applied to an application that performs a similar operation in the computer during the playback of the video, and a recording of a set of input data entered by the user on the second computer corresponding to the set of activities performed by the user on the second computer to be applied to the application to further performance of the similar operation by the application in the computer during the playback of the video;
program instructions, stored on at least one of the one or more storage devices for execution by at least one of the one or more processors via at least one of the one or more memories, to apply control data from the set of control data to the application performing the similar operation in the computer according to the timeline while playing the video, wherein applying the control data to the application performing the similar operation in the computer changes a state of the application in the computer during the playback of the video; and
program instructions, stored on at least one of the one or more storage devices for execution by at least one of the one or more processors via at least one of the one or more memories, to apply input data from the set of input data to the application performing the similar operation in the computer according to the timeline while playing the video, wherein applying the input data to the application furthers the performance of the similar operation by the application in the computer during the playback of the video.

* * * * *